United States Patent
Haravu et al.

(10) Patent No.: US 10,789,205 B1
(45) Date of Patent: *Sep. 29, 2020

(54) CLOUD DATA ARCHIVING USING PROMOTED OBJECTS LIST

(71) Applicant: EMC IP Holding Company LLC, Hopkinton, MA (US)

(72) Inventors: Nagasimha Haravu, Apex, NC (US); Jean-Pierre Bono, Westborough, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 542 days.

This patent is subject to a terminal disclaimer.

(21) Appl. No.: 15/582,742

(22) Filed: Apr. 30, 2017

(51) Int. Cl.
 *G06F 16/11* (2019.01)
 *G06F 11/14* (2006.01)

(52) U.S. Cl.
 CPC ........ *G06F 16/113* (2019.01); *G06F 11/1451* (2013.01); *G06F 11/1464* (2013.01); *G06F 16/128* (2019.01); *G06F 2201/84* (2013.01)

(58) Field of Classification Search
 CPC .. G06F 11/1451; G06F 16/113; G06F 16/128; G06F 11/1464
 USPC .......................................................... 707/645
 See application file for complete search history.

(56) References Cited

U.S. PATENT DOCUMENTS

| | | | |
|---|---|---|---|
| 8,285,681 B2 | 10/2012 | Prahlad et al. | |
| 9,075,755 B1* | 7/2015 | Haase | G06F 11/1456 |
| 10,019,180 B1* | 7/2018 | Miah | G06F 3/0683 |
| 2010/0077165 A1* | 3/2010 | Lu | G06F 11/1451 |
| | | | 711/162 |
| 2010/0333116 A1* | 12/2010 | Prahlad | H04L 67/2852 |
| | | | 719/328 |
| 2011/0161297 A1* | 6/2011 | Parab | G06F 11/1469 |
| | | | 707/646 |
| 2011/0167221 A1* | 7/2011 | Pangal | G06F 3/065 |
| | | | 711/117 |
| 2011/0184912 A1* | 7/2011 | Baptist | H04L 67/1097 |
| | | | 707/639 |
| 2012/0271797 A1* | 10/2012 | Patil | G06F 16/1824 |
| | | | 707/639 |

(Continued)

FOREIGN PATENT DOCUMENTS

CN 102981931 B 3/2013

*Primary Examiner* — Pierre M Vital
*Assistant Examiner* — Nargis Sultana
(74) *Attorney, Agent, or Firm* — BainwoodHuang (57) ABSTRACT

A data processing system archives local snapshots of a primary storage object to cloud storage by dividing an address space of the snapshots into sequential chunks, and organizing the cloud storage into archived snapshots including sets of cloud objects created from respective modified chunks of local snapshots. The archived snapshots are organized into families each having a full snapshot and incremental snapshots. A new family is started by creating a synthesized full snapshot from the archived snapshots of a preceding family, which includes (1) for chunks whose data is contained within one cloud object of the preceding family, logically incorporating the cloud object into the synthesized full snapshot, and (2) for chunks whose data is contained within multiple cloud objects of the preceding family, coalescing the data of the cloud objects into a new cloud object and logically incorporating the new cloud object into the synthesized full snapshot.

20 Claims, 6 Drawing Sheets

(56) References Cited

U.S. PATENT DOCUMENTS

| | | | |
|---|---|---|---|
| 2013/0054533 A1* | 2/2013 | Hao | G06F 16/128 707/649 |
| 2014/0149698 A1* | 5/2014 | Ezra | G06F 12/0864 711/162 |
| 2014/0244935 A1* | 8/2014 | Ezra | G06F 3/065 711/133 |
| 2015/0178167 A1* | 6/2015 | Kulkarni | G06F 16/284 707/649 |
| 2016/0004720 A1* | 1/2016 | Tabaaloute | G06F 16/178 707/639 |
| 2017/0206140 A1* | 7/2017 | Smith | G06F 16/2308 |

* cited by examiner

CLOUD DATA ARCHIVING USING PROMOTED OBJECTS LIST

BACKGROUND

The disclosure is generally directed to archiving of data, in particular point-in-time copies referred to as "snapshots" or "snaps", to cloud-based storage.

"Cloud-based" storage refers to data storage as a service offered to clients or customers, having a generalized object-based interface and generally wide-area availability (i.e., ability to connect via the public internet). In particular, the disclosure relates to archiving user-created snaps for all type of objects supported in a data storage system, such as logical units (LUN), file systems (FS), datastores, virtual volumes (vVOLs), etc. A gateway device is used to interface one or multiple data storage systems to a cloud service. In one example, access is provided using the S3 API to a cloud solution such as Azure, Virtustream, Amazon, etc. A storage administrator may be able to define whether the solution is optimized for backup or restore, or strike a compromise between the two by adjusting the frequency of establishing a common base and whether the backups should be incremental, differential or a mix of both.

More particularly, cloud service providers (CSPs) like Amazon offer cloud storage services wherein data can be stored as a set of 'objects' in a 'bucket'. There can be one or more buckets associated with a customer 'account'. A CSP may offer an interface such as a RESTful API (REST API) for managing storage. The REST API uses HTTP primitives such as PUT, GET, and DELETE to save and retrieve data. A CSP may charge its customers on two fronts:

Amount of storage used in the cloud

Number of REST API calls made

An object is a fixed size contiguous series of data with a maximum size, e.g., 5 TB. An object is treated as a whole and is saved and retrieved as one unit. Although an object can be uploaded in multiple parts (e.g., up to 10,000), it cannot be partially updated or read. For example, if an object of size 1 MB has been uploaded to the cloud, the client cannot update just a 50 KB range of data somewhere within the 1 MB extent of the object, such as at the beginning or end for example. The entire object must be written or read. This limitation offers challenges in how cloud storage can be used for periodic archival of snapshots.

SUMMARY

A technique is disclosed for archiving snapshots from a data storage system to cloud storage that promotes goals of efficient backup and use of cloud resources, efficient retrieval, and efficient aging-out of archived snapshots. In particular, the disclosed technique employs a mapping of chunks of storage objects to cloud objects and a family organization of a series of archived snapshots, with synthetic creation of full backups for each family that does not require network transfer of an entire storage object from the data storage system.

In particular, a method is disclosed of operating a data processing system to archive local snapshots of a primary storage object to cloud storage. The method includes dividing an address space of the local snapshots into sequential chunks each including a predetermined number of allocation units (e.g., 1 MB chunks each having 128 8K blocks). The method further includes organizing the cloud storage into archived snapshots corresponding to the local snapshots, the archived snapshots including respective sets of cloud objects created from respective modified chunks of respective local snapshots. The archived snapshots are organized into families each having a full snapshot and one or more incremental snapshots referenced to preceding archived snapshots of the family. A given local snapshot is restored by sequentially applying the incremental snapshots to the full snapshot in a corresponding given family. The method further includes starting a new family of archived snapshots by creating a synthesized full snapshot from the archived snapshots of a preceding family. The creation of the synthesized full snapshot includes (1) for chunks whose data is fully contained within a respective cloud object of the preceding family, logically incorporating the cloud object into the synthesized full snapshot, and (2) for chunks whose data is contained within multiple respective cloud objects of the preceding family, coalescing the data of the cloud objects into a new cloud object and logically incorporating the new cloud object into the synthesized full snapshot. For each family, a promoted objects list is maintained that identifies cloud objects of the family that have been logically incorporated into a succeeding family, the promoted objects list being used when aging out an oldest family to exclude the identified cloud objects from deletion.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Snapshot Families, Retrieval, and Aging

Snapshots of a primary storage object, such as a logical unit or LUN, are periodically archived to the cloud (for example, once a day). When the very first snapshot is archived, all of its data is copied to the cloud. For subsequent archives, only the incremental changes between the current snapshot and its previous snapshot are archived to the cloud. This full copy and the set of incremental copies that follow it together form a snapshot family. After every N snapshots are archived to the cloud, a new full copy is archived to the cloud thus creating a new family. However, rather than requiring copying of the all the storage object data, the new full copy is created as a synthesized full copy from a previously archived family, as described more herein, making more efficient use of upload bandwidth and cloud storage resources.

When a snapshot is retrieved from the cloud, the full copy in the family is retrieved and all of the incremental snapshots in the family are applied chronologically until the desired snapshot is reached. The number of incremental copies per family can be selected to provide a desired balance between archiving performance (favoring relatively more incremental archives per family) and retrieval performance (favoring relatively fewer).

At any given time, only a maximum number of families are retained in the cloud. Once that limit is reached, then when a new family is created by archiving a full snapshot, the oldest family is deleted by deleting all of the snapshots in the family. Here again, the number of incremental copies per family can be selected for a desired balance, as frequent aging would favor use of relatively fewer incremental copies.

Performing a full copy is expensive both in terms of the amount of time it takes to upload the data as well as the amount of storage consumed in the cloud. For example, a 1 TB fully allocated LUN could require many hours to upload even at a sustained upload speed of 100 Mbps, and each full copy could cost tens of dollars per month to maintain in the cloud storage.

The description below discloses three techniques that support the general technique of using synthesized full backup for archiving snapshots to the cloud: (1) chunk-based archiving and reuse, (2) optimizing for latest metadata, and (3) promoted objects list.

DESCRIPTION OF EMBODIMENTS

The present description sets forth an example implementation that utilizes a cloud gateway device in connection with archiving snapshots to a data storage system. Those skilled in the art will appreciate that in an alternative embodiment, cloud-archiving functionality may be integrated into the data storage system itself. The claims herein extend to such an alternative implementation.

Figure 1:
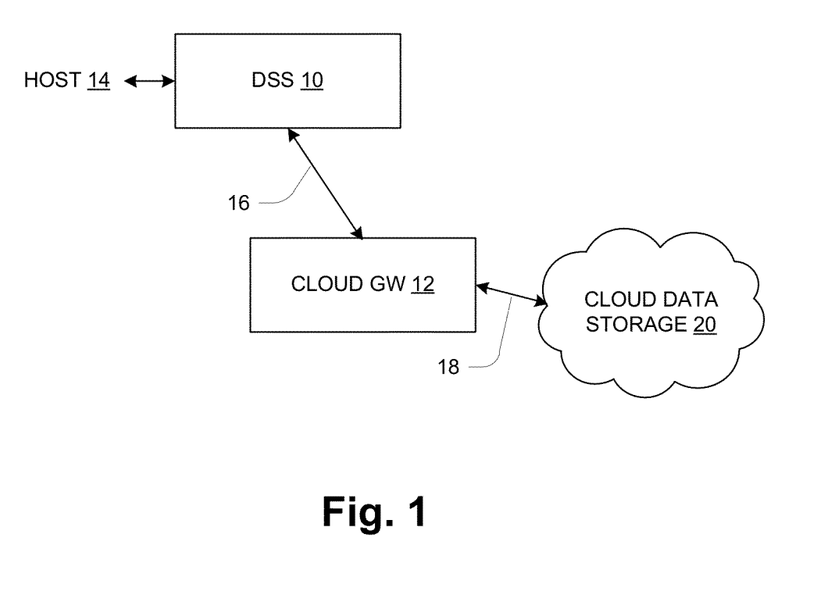
FIG. 1 is a block diagram of a data processing system.

FIG. 1 shows a distributed data processing system including a data storage system (DSS) 10 and a cloud gateway (GW) 12. The DSS 10 has an interface to a host computer or host 14, as well as connections to a channel to the cloud GW 12. In particular, the channel to the cloud GW 12 is a block-based channel 16 for transferring data between the DSS 10 and the cloud GW 12. The cloud GW 12 has a connection to a cloud-protocol, object-based channel 18 to a cloud data storage system or service 20, also referred to as "cloud data storage 20" herein. In one embodiment the GW 14 may be realized by a Cloud Tiering Appliance as sold by Dell EMC.

Regarding the channel 16, "block-based" refers to use of storage-oriented protocols employing the model of a storage device as a linear array of fixed-size blocks, with both reads and writes specifying a starting logical block address (LBA) and a transfer length. iSCSI is a well-known example of such a protocol. In contrast, "object-based" for channel 18 refers to use of a more abstracted object-oriented protocol and model. An object is a linear array of data elements analogous to a file, but an object store is generally a flat structure (with objects identified by corresponding unique IDs) in contrast to the conventional hierarchical structure of a file system. Also, the exact structure of an object, and in particular its metadata, may be customized for different applications, while file systems impose a rigid metadata regime on the constituent files. Another view of objects is as application-level structures, such as images, videos, documents, apps, etc. Examples of object-based cloud storage 20 include Amazon S3 and Microsoft Azure.

One benefit of cloud-based backup and restore is easier access to the cloud-based copy of a storage object, which can enable or enhance operations. As an example, in the system of FIG. 1 it is relatively easy to obtain a point-in-time copy of a storage device by restoring from the cloud data storage 20, and because of the wide-area accessibility of the cloud data storage 20, this copy can easily be provided almost anywhere there is Internet connectivity.

Figure 2:
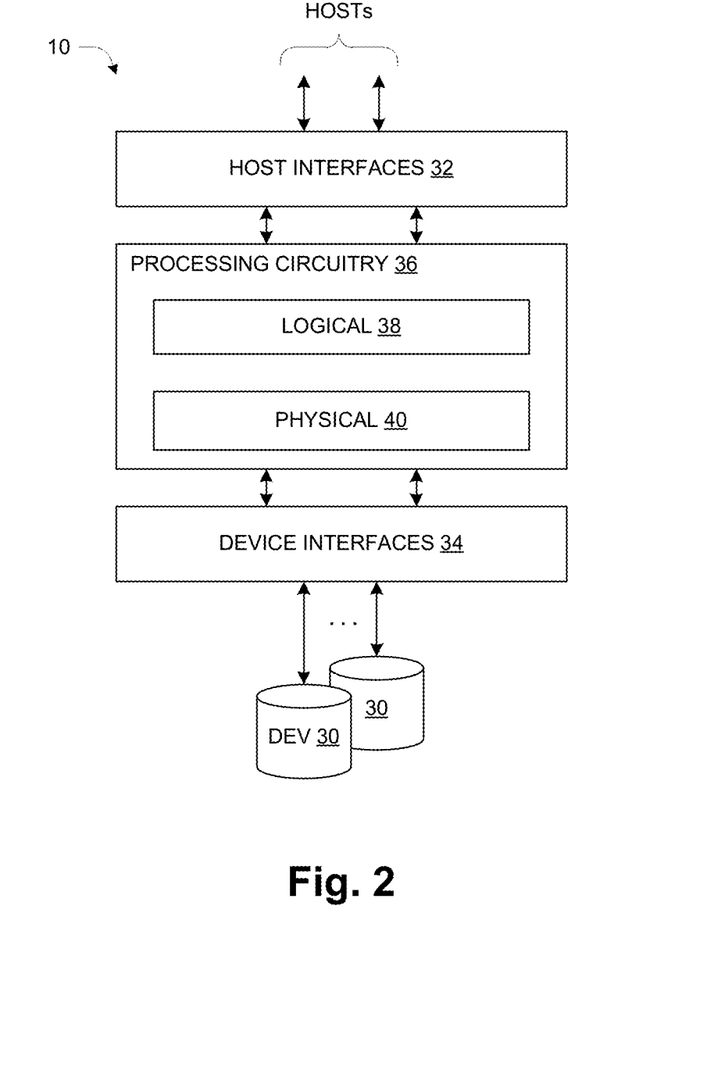
FIG. 2 is a block diagram of a data storage system.

FIG. 2 shows structure and organization of the data storage system 10 which provides data storage services to the hosts 14 (not shown) using data storage devices (DEVs) 30, such as magnetic disks, Flash memory, etc. The devices 30 are also referred to as "disks" herein. From a hardware perspective, the data storage system 10 includes host interfaces 32, device interfaces 34, and processing circuitry 36. Both the host interfaces 32 and device interfaces 34 are typically interfaces to storage-oriented interconnects, such as FibreChannel, iSCSI, etc. The processing circuitry 36 includes one or more processors, memory and I/O interface circuitry connected together by high-speed, intra-system interconnect (details not shown), as generally known in the art. The processing circuitry 36 executes computer program instructions to form functional operation components in layers as shown: a logical layer 38, and a physical layer 40. The logical layer 38 defines and operates upon higher-level storage objects such as host file systems, volumes, logical units (LUNs), virtual volumes (vVOLs), etc., using underlying internal resources provided by the physical layer 40. The physical layer 40 defines and operates upon lower-level storage objects, including for example RAID groups, disk extents, etc. using the physical storage resources of the devices 30. Some components may span the layers 38, 40, such as device caching components for example. The physical layer 40 may employ an internal file system whose files store higher-level objects of the logical layer 38. The components work together in a coordinated manner to provide storage functionality as generally known in the art. One general example of data storage systems having a structure like that of FIG. 2 are systems sold under the name Unity™ by Dell EMC.

Figure 3:
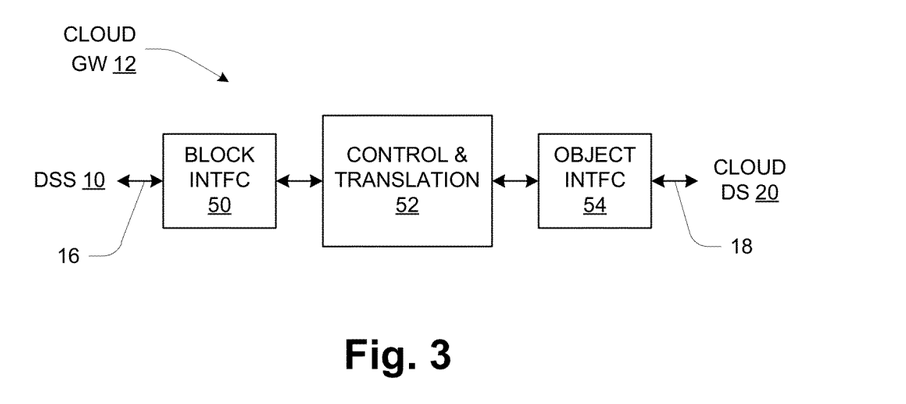
FIG. 3 is a block diagram of a cloud gateway device.

FIG. 3 shows functional organization of the cloud GW 14. It includes block interface logic 50, control and translation logic 52, and object interface logic 54. The block interface logic 50 connects to a DSS 10 by the block-based channel 16, and presents a block-based interface, e.g., iSCSI. Thus from the perspective of the connected DSS 10, the cloud GW 12 appears as a block-oriented storage system. The object interface 54 connects to the cloud data storage 20 by the cloud object-based channel 18, and presents an object interface. Thus from the perspective of the cloud data storage 20, the cloud GW 12 appears as a client providing abstracted objects for backup. Additional detail regarding objects is given below. The object interface 54 generally employs an underlying wide-area network interface/protocol, such as HTTP running on top of TCP/IP for example.

The control and translation logic 52 performs both control and translation functions in connection with backup and restore operations as described more herein. Translation refers to conversion between the block-oriented structuring of data of the block interface 50 and the object-oriented structuring of data of the object interface 54. In one embodiment the logic 52 maps a logical storage device defined at the block interface 50 to a file defined at the object interface 54. The control and translation logic 52 includes buffering in order to hold data of one format (e.g., block) while translating it to the other (e.g., object) and transferring it out.

Snapshot Families, Retrieval, and Aging

As outlined above, the DSS 10 takes periodic snapshots of a primary data object (e.g., LUN), and these snapshots are periodically archived to the cloud 20 (for example, once a day). When a very first snapshot is archived, all of its data is copied to the cloud 20. For subsequent archives, only the incremental changes between the current snapshot and its previous snapshot are archived to the cloud. This full copy and the set of incremental copies that follow it together form a snapshot family. After every N snapshots are archived to the cloud, a new full copy is archived to the cloud thus creating a new family.

Figure 4:
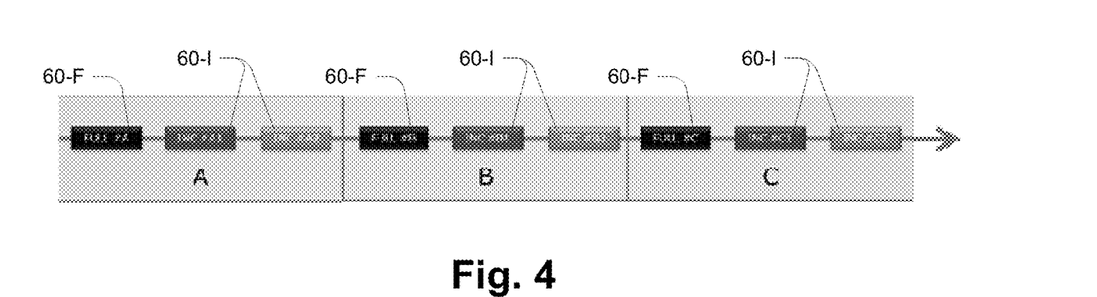
FIG. 4 is a schematic depiction of a family organization of archived snapshots.

FIG. 4 presents a simplified depiction of organizing archived snapshots into families. Individual snapshots 60 are either full (60-F) or incremental (60-I). Three families A, B and C are shown, each having one full snapshot 60-F and two successive incremental snapshots 60-I.

As outlined above, when a snapshot 60 is to be retrieved from the cloud 20 (e.g., A2), first the full copy 60-F in the family is retrieved (A) and then all of the incremental snapshots 60-I in the family are applied chronologically until the desired snapshot is reached (A1 followed by A2).

Chunk-Based Archiving and Reuse

The presently disclosed technique proposes the following approach to realize a synthetic full backup:
1. A snapshot's address space is broken down into fixed size chunks
2. An archived snapshot is persisted in the cloud in chunks (one chunk per cloud object) to take advantage of the following two storage properties:
    a. Cold Data: Majority of data are not modified frequently
    b. Spatial Locality of Data: Adjacent blocks of data tend to be updated together
3. Chunks can be reused between snapshot families when they exhibit the above properties
    a. Chunks are owned by a single family
    b. If an existing chunk is needed in multiple families, the latest (most recent) family is considered to own the chunk
4. A snap family is deleted by deleting all of its owned chunks
    a. Only the oldest snap family can be deleted FIGS. 5-8 illustrate two basic aspects of the disclosed technique, namely (1) creating snapshots in an incremental fashion, and (2) dividing an object's address space into chunks and mapping modified chunks to cloud objects for archiving.

First, to make an incremental snap 60-I, a "Snap Diff" routine may be used to identify the differences between the current contents of the primary object and the last snapshot of the object. The Snap Diff returns a list of "extents" that are different between the current and previous snap of the storage object, where each extent is a set of successive locations identified by an offset and length. These extents are flagged as either modified (M) (i.e., data has been added or modified) or deallocated (D) (i.e., the data previously stored in these areas has been deleted).

Figure 5:
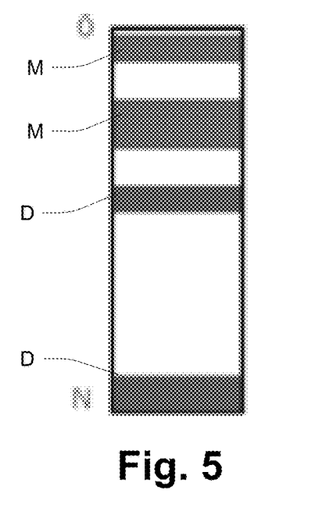
FIGS. 5-8 are schematic depictions of an area of a storage object including identified extents, a division of address space into chunks, and mapping the chunks to cloud objects.

FIG. 5 shows an example in which two extents are identified as modified (M) and two as deallocated (D).

Figure 6:
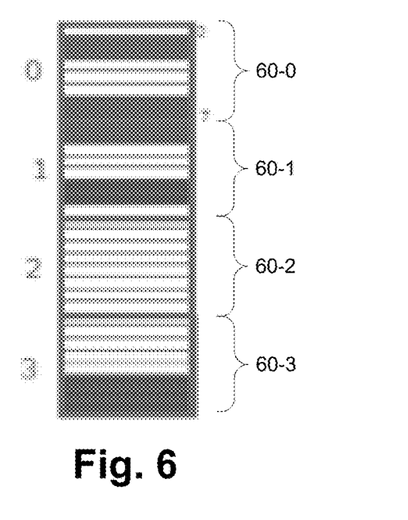

FIG. 6 shows the same section of the object with an identification of the chunks 60 (shown as 60-0, 60-1, 60-2 and 60-3), each including a number (e.g., 8) of the fixed-sized allocation units (AUs, separated by close-spaced horizontal lines in FIG. 6). In a more realistic example, a chunk size of 1 MB might be used, which is 128 8-KB AUs.

Figure 7:
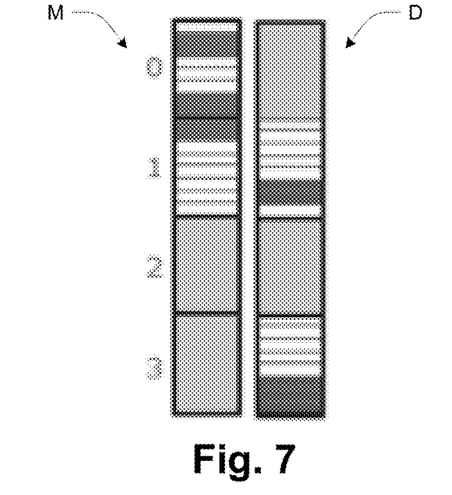
Figure 8:
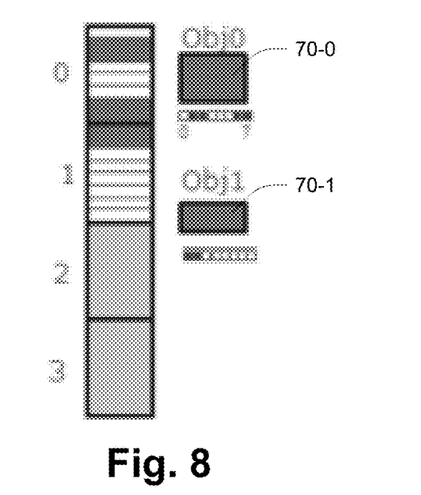

FIG. 7 illustrates a feature used to facilitate tracking, namely separating modified (M) and deallocated (D) chunks. On the left is a representation of the modified (M) chunks. i.e., chunks having modified extents, and on the right is representation of the deallocated (D) chunks, i.e., chunks having deallocated extents. Thus in this example, based on Snap Diff:

Chunk 0 has M only
Chunk 1 has M and D
Chunk 2 has neither
Chunk 3 has D only FIG. 8 illustrates the mapping of chunks to cloud objects. A unique cloud object 70 is created for each modified (M) chunk 60. In this example, objects 70-0 and 70-1 are created for modified (M) chunks 60-0 and 60-1. Each cloud object 70 is identified by a corresponding universally unique identifier (UUID), which in this description is represented by identifiers Obj0, Obj1, etc., and which is used as the object's name in the cloud 20. As shown, the modified contents of an M chunk 60 are packed and written to the object 70, optionally compressed and/or encrypted. The object 70 also includes a bitmap used to indicate which portion of the chunk is stored in the object. The object size may vary from a fraction of a single block to an entire chunk size.

Figure 9:
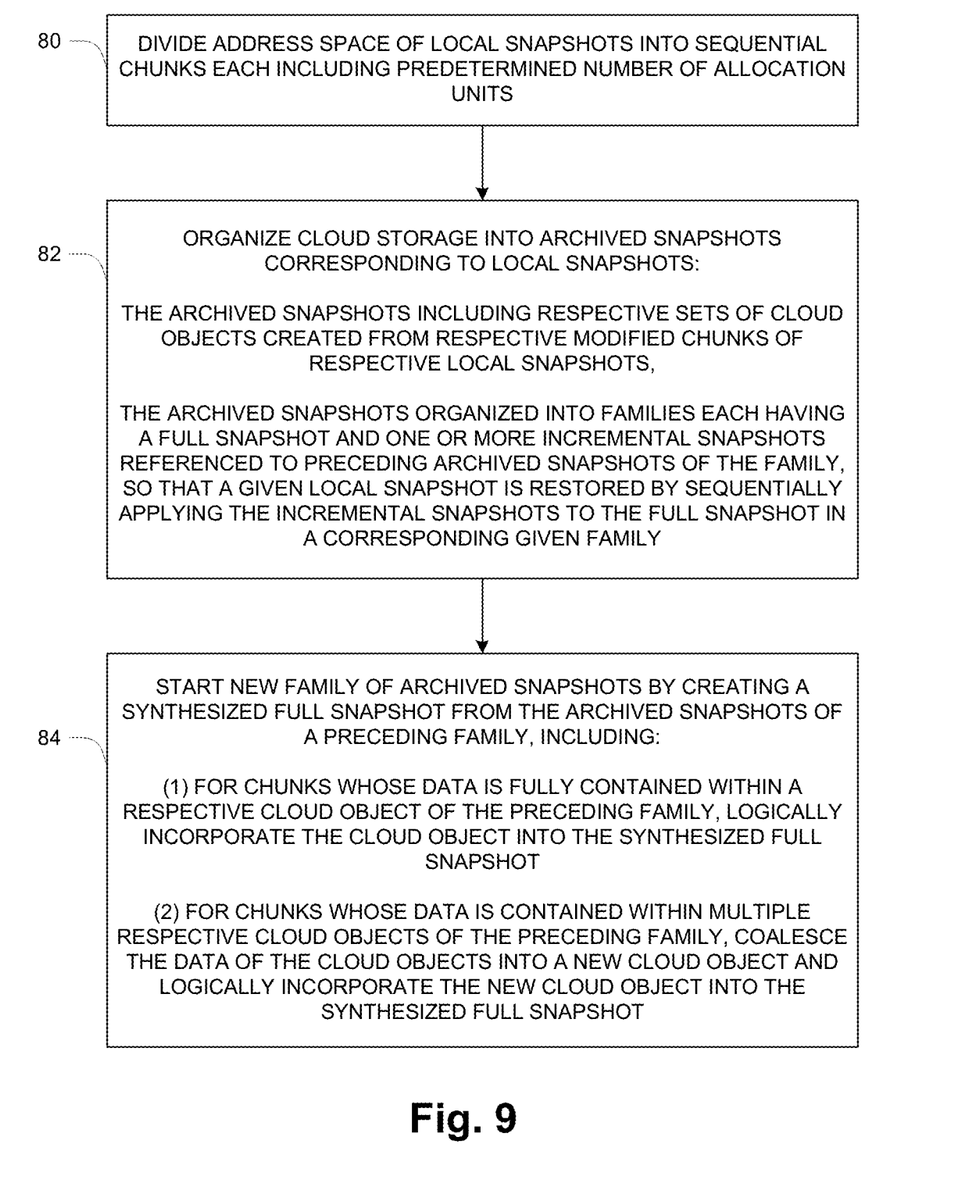
FIG. 9 is a flow diagram of certain basic archiving operation.

FIG. 9 provides a high-level flow of pertinent operation, i.e., operating a data processing system to archive local snapshots of a primary storage object to cloud storage.

At 80, the an address space of the local snapshots is divided into sequential chunks each including a predetermined number of allocation units.

At 82, the cloud storage is organized into archived snapshots corresponding to the local snapshots. The archived snapshots include respective sets of cloud objects created from respective modified chunks of respective local snapshots. The archived snapshots are organized into families each having a full snapshot and one or more incremental snapshots referenced to preceding archived snapshots of the family, such that a given local snapshot can be restored by sequentially applying the incremental snapshots to the full snapshot in a corresponding given family.

At 84, a new family of archived snapshots is started by creating a synthesized full snapshot from the archived snapshots of a preceding family. This includes (1) for chunks whose data is fully contained within a respective cloud object of the preceding family, logically incorporating the cloud object into the synthesized full snapshot, and (2) for chunks whose data is contained within multiple respective cloud objects of the preceding family, coalescing the data of the cloud objects into a new cloud object and logically incorporating the new cloud object into the synthesized full snapshot. The term "logically incorporating" refers to the transfer of ownership to the new family, which is described in more detail below.

Figure 10:
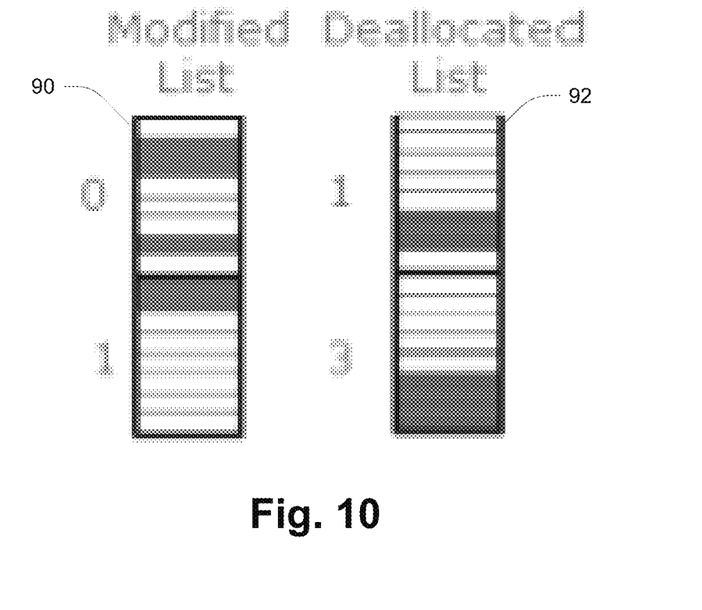
FIG. 10 is a schematic depiction of a modified list and deallocated list.

FIG. 10 illustrates the persisting of snapshot metadata (Snap MD) as an object that forms part of an archived snapshot. A snap-specific unique object is created and stored in the cloud 20 for each snap to hold the snap metadata: attributes (name, size, etc.), a modified (M) list 90, and a deallocated (D) list 92.

The M list 90 contains:
Chunk #
Cloud object ID
Bitmap of modified blocks in the chunk
Flags indicating use of compression and/or encryption The D list 92 contains:
Chunk #
Bitmap of deallocated blocks in chunk
In the illustrated example, chunks 1 and 0 are modified, and chunks 1 and 3 are deallocated.

Snapshot Retrieval

The following are the steps used to retrieve a given snap. A specific example is given below to illustrate this process.

Figure 11:
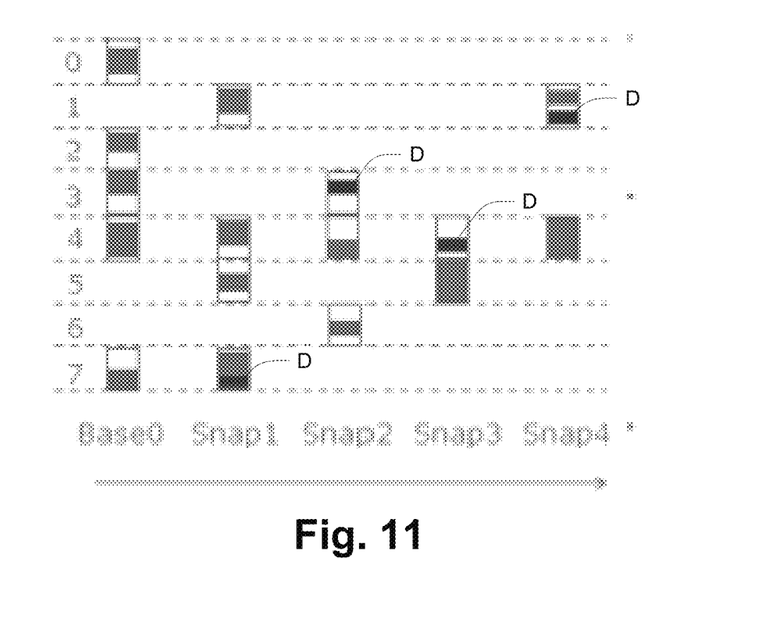
FIG. 11 is a schematic depiction of changes to a set of chunks, captured in respective cloud objects, over a set of successive snapshots.

1. Identify the chunk addresses for the snap (requires retrieving MD for snap and all preceding snaps in family)
2. For each chunk address:
   a) utilize a single object from one of the snaps of the family if:
      There is only one object at that address (apply the one); or
      The latest object is a superset of all earlier objects (i.e., it contains all the most recently modified data—in this case, apply the latest object)
   b) otherwise, coalesce the objects starting from latest object until all blocks in the chunk are retrieved FIG. 11 illustrates a particular example of the above, in which Snap 4 is to be retrieved. In FIG. 11, the deallocated (D) extents are indicated by D, while all other dark areas of objects are modified (M) extents.

The following can be observed:

1. Chunks 0, 2, 6 have been allocated only once and can be retrieved directly from their respective snaps (0, 0 and 2 respectively). These are examples of "cold" chunks, i.e., infrequently modified.
2. Chunks 4 and 5 have been allocated more than once, but the latest copy (snaps 4 and 3 respectively) is a superset so it can be retrieved directly. These are examples of chunks with spatial locality.
3. Chunks 1, 3 and 7 need coalescing, which involves starting at the latest snap and successively applying the M and D objects from earlier snaps. For chunk 3 for example, application of snap 2 deallocates an extent as shown. The base snap 0 has modified areas outside that extent (above and below), and these modifications are also applied in order to arrive at the correct contents of chunk 3 for Snap 2.

Figure 12:
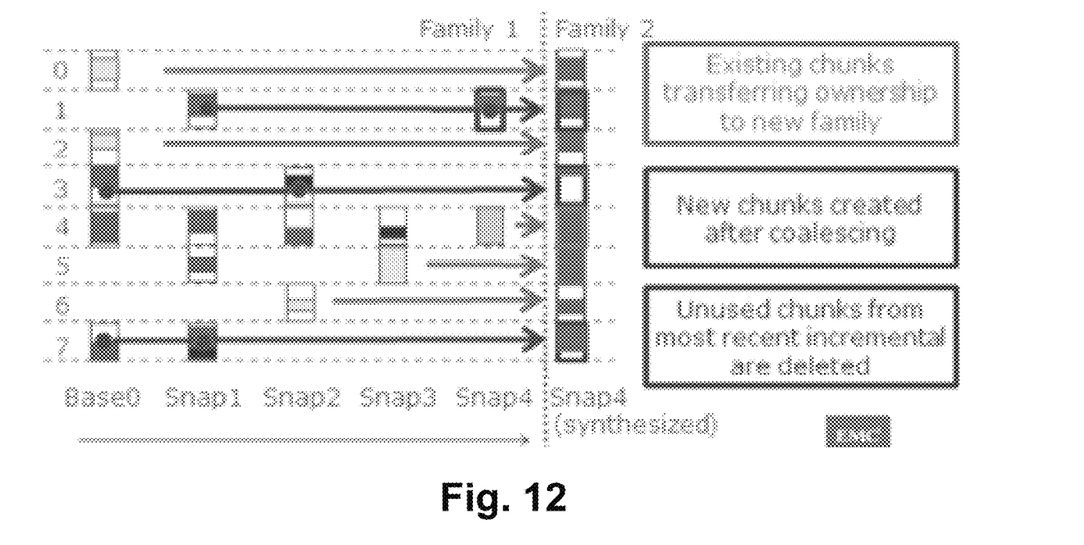
FIG. 12 is a schematic depiction of creating a synthesized full snapshot.

FIG. 12 illustrates synthetic full backup. Generally, this involves first performing an incremental snap backup and then promoting it to a full backup or snapshot using a process similar to snap retrieval as described above. In this example, there are single objects for chunks 0, 2, 4, 5 and 6 that can be used directly (from snaps 0, 0, 4, 3, and 2 respectively). For these, the ownership is simply transferred to the new family—no new objects are created or uploaded. For chunks 1, 3 and 7, these are coalesced into respective new objects that become owned by the new family. As mentioned above, the transfer of ownership or establishing ownership of a new object is an example of logically incorporating an object into the new family.

After a synthetic full backup is created, the snapshot metadata for the new archived snapshot is created and stored in a corresponding object as explained above.

Optimize for Latest Metadata

In the cloud archiving approach, the latest snap that has been archived is important for two reasons:
1. It is used as a basis for synthetic full backup
2. In a disaster recovery situation, this is the likely candidate for retrieval Thus in some embodiments it may be desirable to maintain separate metadata for the latest (most recent) snap to optimize the above use cases. The metadata consists of the following two lists:

Allocated list: A list of all allocated chunks, with each entry containing the following:
Chunk #
Bitmap indicating allocated blocks in the chunk
If all allocated blocks are in a single object, the object ID of the object containing the blocks Deallocated list: A list of chunks that were previously allocated in the family but now deallocated. Each entry contains chunk # only.

Although this description identifies a need for extra metadata for quick retrieval of the latest snap, in general this could be done for any snap for a similar reason, i.e., to facilitate quick retrieval of such snap. An example is the use of a "golden" snap having special status during operation.

Figure 13:
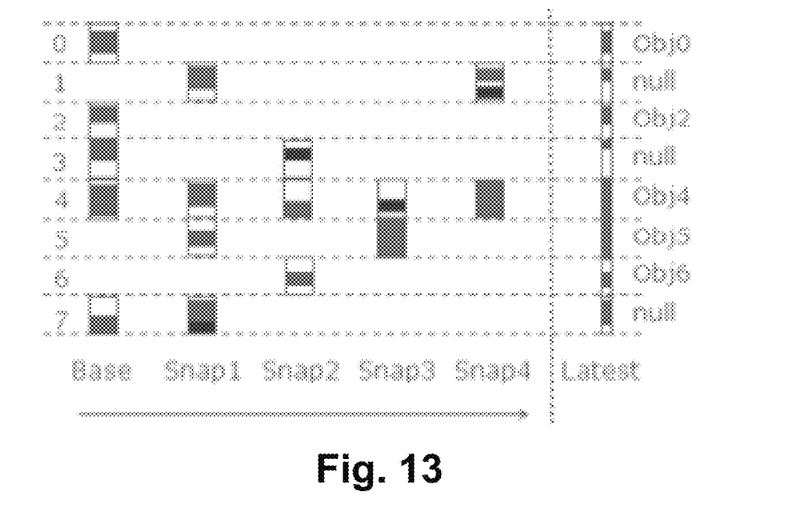
FIG. 13 is a schematic depiction of latest snapshot metadata.

Below is a description of maintaining the latest Snap metadata:
1. When a chunk first appears for a family:
   This case is identified by there being no entry for the chunk in the allocated (A) list 90)
   Add a new entry in A list and set object ID for corresponding cloud object
   Delete entry for this chunk in the D list (if any)
2. When an existing chunk is updated (M, D or both):
   This case is identified when entry already exists in A list
   Incorporate new chunk's M/D bits into existing entry (bitwise OR/XOR logic)
   If resulting bitmap is a superset for the updated chunk, then update the object ID to point to the single superset object, otherwise clear the object ID
   If resulting bitmap has no bit set (entire chunk deallocated), remove this entry and add an entry to the D list FIG. 13 shows an example of the above, specifically the values for the object IDs. Null values indicate chunks for which coalescing is required.

Promoted Objects List

As described above, the synthesized full backup technique relies on the concept of object ownership by a family. One way to realize the technique is to explicitly track ownership by family, i.e., to have a per-family representation of all objects that it owns. Alternatively, an optimization may be used that avoids the need to explicitly track ownership of chunks by family. This optimization uses additional metadata which essentially is used to track a list of objects that have been promoted from a family, i.e., objects that have become un-owned by the family.

A promoted object list is maintained as follows:
It is a per-family list of objects, and does not exist for the latest family (no promotions yet)
It is created when a synthetic full snapshot is created for the new family, and it identifies those objects that have been promoted to the new family as part of this process
When a family is aged out (see below), it is used to prevent deletion of promoted objects
Using this list, there is no need to explicitly track ownership of chunks by family As mentioned above, there will generally be a limit on the number of archived snapshots that are maintained, according to some policy. For example, snapshots may be maintained for one year and then deleted, so at any given time there are archived snapshots for respective points in time (e.g., daily) over the last year. To enforce this limit, older families are removed or "aged out" when new families are created.

Below is a description of aging out an oldest family:
Walk through all snap metadata in the family and identify the unique list of objects for modified chunks
From that list, exclude objects that have been promoted to the next family, according to the promoted objects list Delete the remaining identified objects
Delete all the metadata for the family Summary of Metadata Below is a summary of metadata used in connection with the techniques described herein:
1. For each storage object:
List of families (ordered)
Latest Snap metadata: A list, D list
2. For each family:
List of Snaps (ordered)
Promoted object list
3. For each Snap:
Modified (M) list
Deallocated (D) list While various embodiments of the invention have been particularly shown and described, it will be understood by those skilled in the art that various changes in form and details may be made therein without departing from the scope of the invention as defined by the appended claims.

What is claimed is:

1. A method of operating a data processing system to archive local snapshots of a primary storage object to cloud storage, comprising:
dividing an address space of the local snapshots into sequential chunks each including a predetermined number of allocation units;
organizing the cloud storage into archived snapshots corresponding to the local snapshots, the archived snapshots including respective sets of cloud objects created from respective modified chunks of respective local snapshots, the archived snapshots organized into families each having a full snapshot and one or more incremental snapshots referenced to preceding archived snapshots of the family, a given local snapshot being restored by sequentially applying the incremental snapshots to the full snapshot in a corresponding given family;
starting a new family of archived snapshots by creating a synthesized full snapshot from the archived snapshots of a preceding family, including (1) for chunks whose data is fully contained within a respective cloud object of the preceding family, logically incorporating the cloud object into the synthesized full snapshot, and (2) for chunks whose data is contained within multiple respective cloud objects of the preceding family, coalescing the data of the cloud objects into a new cloud object and logically incorporating the new cloud object into the synthesized full snapshot; and
for each family, maintaining a promoted objects list identifying promoted cloud objects of the family that have been logically incorporated into a succeeding family by transferring ownership of the promoted cloud objects to the succeeding family without creating a copy and logically retaining the promoted cloud objects in the preceding family in an unowned state, and using the promoted objects list when aging out an oldest family to exclude the promoted cloud objects from deletion.

2. The method of claim 1, wherein the synthesized full snapshot serves as a reference snapshot for the new family, the new family subsequently being populated with incremental snapshots referenced to the reference snapshot of the new family.

3. The method of claim 1, wherein the data processing system enforces a limit on a number of families retained in the cloud storage, and further including, in connection with the starting of the new family, deleting an oldest family from the cloud storage, the oldest family being deleted by deleting all snapshots of the oldest family and only those cloud objects of the oldest family that are owned by the oldest family.

4. The method of claim 1, further including persisting snapshot metadata as an object that forms part of an archived snapshot for a chunk in the cloud storage.

5. The method of claim 1 used in connection with restoring a snapshot previously archived to the cloud storage, the restoring including:
identifying chunk addresses of all chunks for the snapshot;
for each chunk address:
a) utilizing a single cloud object from one of the snapshots of the family when there is only one cloud object at that address and when a latest cloud object is a superset of all earlier cloud objects; and
b) otherwise, coalescing cloud objects starting from latest cloud object until all allocation units in the chunk are retrieved.

6. The method of claim 5, wherein coalescing a cloud object includes starting at a latest snapshot and successively applying modified and deleted cloud objects from earlier snapshots.

7. The method of claim 1, further including continually maintaining latest snapshot metadata as the archived snapshots are created over time, the latest snapshot metadata used to quickly identify chunks to be retrieved to restore the latest snapshot, the latest snapshot metadata including an allocated list and a deallocated list, the deallocated list identifying all chunks previously allocated in the family but currently deallocated, the allocated list identifying all currently allocated chunks and, for each chunk whose contents are stored in a corresponding single cloud object, an identifier of the cloud object.

8. The method of claim 7, wherein maintaining the latest snapshot metadata includes:
when a chunk first appears for a family, as indicated by there being no entry for the chunk in the allocated list, (1) adding a new entry in the allocated list and setting the object identifier for the corresponding cloud object, and (b) deleting any existing entry for this chunk in the deallocated list; and
when an existing chunk is updated by modification or deallocation, as indicated by an entry already existing in the allocated list, (1) incorporating metadata bits of the chunk into the existing entry, (2) if the resulting bitmap is a superset for the updated chunk, then updating the object identifier to point to a corresponding single superset cloud object, and otherwise clearing the object identifier, and (3) if the resulting bitmap has no bit set, indicating entire deallocation of the chunk, then removing the entry from the allocated list and adding a corresponding entry to the deallocated list.

9. The method of claim 1, further including, in connection with the starting of the new family, deleting an oldest family from the cloud storage, including:
reading all snapshot metadata in the family and identifying a unique list of cloud objects for modified chunks of the family;
from the unique list, excluding cloud objects that have been promoted to a next family, according to the promoted objects list;
deleting cloud objects identified in the list after the promoted cloud objects have been excluded; and
deleting all metadata for the family.

10. A data processing system including local storage and an interface to cloud storage, the data processing system including computer processing circuitry configured and operative to execute computer program instructions to perform a method of archiving local snapshots of a primary storage object to cloud storage, the method including:

dividing an address space of the local snapshots into sequential chunks each including a predetermined number of allocation units;

organizing the cloud storage into archived snapshots corresponding to the local snapshots, the archived snapshots including respective sets of cloud objects created from respective modified chunks of respective local snapshots, the archived snapshots organized into families each having a full snapshot and one or more incremental snapshots referenced to preceding archived snapshots of the family, a given local snapshot being restored by sequentially applying the incremental snapshots to the full snapshot in a corresponding given family;

starting a new family of archived snapshots by creating a synthesized full snapshot from the archived snapshots of a preceding family, including (1) for chunks whose data is fully contained within a respective cloud object of the preceding family, logically incorporating the cloud object into the synthesized full snapshot, and (2) for chunks whose data is contained within multiple respective cloud objects of the preceding family, coalescing the data of the cloud objects into a new cloud object and logically incorporating the new cloud object into the synthesized full snapshot; and for each family, maintaining a promoted objects list identifying promoted cloud objects of the family that have been logically incorporated into a succeeding family by transferring ownership of the promoted cloud objects to the succeeding family without creating a copy and logically retaining the promoted cloud objects in the preceding family in an unowned state, and using the promoted objects list when aging out an oldest family to exclude the promoted cloud objects from deletion.

11. The data processing system of claim 10, wherein the synthesized full snapshot serves as a reference snapshot for the new family, the new family subsequently being populated with incremental snapshots referenced to the reference snapshot of the new family.

12. The data processing system of claim 10, wherein the method further includes enforcing a limit on a number of families retained in the cloud storage, and, in connection with the starting of the new family, deleting an oldest family from the cloud storage, the oldest family being deleted by deleting all snapshots of the oldest family and only those cloud objects of the oldest family that are owned by the oldest family.

13. The data processing system of claim 10, wherein the method further includes persisting snapshot metadata as an object that forms part of an archived snapshot for a chunk in the cloud storage.

14. The data processing system of claim 10, wherein the method is used in connection with restoring a snapshot previously archived to the cloud storage, the restoring including:

identifying chunk addresses of all chunks for the snapshot;

for each chunk address:

a) utilizing a single cloud object from one of the snapshots of the family when there is only one cloud object at that address and when a latest cloud object is a superset of all earlier cloud objects; and b) otherwise, coalescing cloud objects starting from latest cloud object until all allocation units in the chunk are retrieved.

15. The data processing system of claim 14, wherein coalescing a cloud object includes starting at a latest snapshot and successively applying modified and deleted cloud objects from earlier snapshots.

16. The data processing system of claim 10, wherein the method further includes continually maintaining latest snapshot metadata as the archived snapshots are created over time, the latest snapshot metadata used to quickly identify chunks to be retrieved to restore the latest snapshot, the latest snapshot metadata including an allocated list and a deallocated list, the deallocated list identifying all chunks previously allocated in the family but currently deallocated, the allocated list identifying all currently allocated chunks and, for each chunk whose contents are stored in a corresponding single cloud object, an identifier of the cloud object.

17. The data processing system of claim 16, wherein maintaining the latest snapshot metadata includes:

when a chunk first appears for a family, as indicated by there being no entry for the chunk in the allocated list, (1) adding a new entry in the allocated list and setting the object identifier for the corresponding cloud object, and (b) deleting any existing entry for this chunk in the deallocated list; and when an existing chunk is updated by modification or deallocation, as indicated by an entry already existing in the allocated list, (1) incorporating metadata bits of the chunk into the existing entry, (2) if the resulting bitmap is a superset for the updated chunk, then updating the object identifier to point to a corresponding single superset cloud object, and otherwise clearing the object identifier, and (3) if the resulting bitmap has no bit set, indicating entire deallocation of the chunk, then removing the entry from the allocated list and adding a corresponding entry to the deallocated list.

18. The data processing system of claim 10, wherein the method further includes, in connection with the starting of the new family, deleting an oldest family from the cloud storage, including:

reading all snapshot metadata in the family and identifying a unique list of cloud objects for modified chunks of the family;

from the unique list, excluding cloud objects that have been promoted to a next family, according to the promoted objects list;

deleting cloud objects identified in the list after the promoted cloud objects have been excluded; and deleting all metadata for the family.

19. The method of claim 1, wherein the cloud objects are of variable size ranging from a single allocation unit to an entire chunk size;

a unique cloud object is created for each modified chunk; and modified contents of a modified chunk are packed and written to the cloud object along with a bitmap indicating which portion of the chunk is stored in the cloud object.

20. The method of claim 1, wherein each allocation unit is a fixed-size data block.

* * * * *